United States Patent [19]

Miller

[11] Patent Number: 4,775,987
[45] Date of Patent: Oct. 4, 1988

[54] BROADBAND DIGITAL TRANSMISSION SYSTEMS

[75] Inventor: Michael R. Miller, Colchester, England

[73] Assignee: British Telecommunications plc, London, England

[21] Appl. No.: 802,007

[22] PCT Filed: Mar. 20, 1985

[86] PCT No.: PCT/GB85/00108
§ 371 Date: Dec. 27, 1985
§ 102(e) Date: Dec. 27, 1985

[87] PCT Pub. No.: WO85/04300
PCT Pub. Date: Sep. 26, 1985

[30] Foreign Application Priority Data

Mar. 20, 1984 [GB] United Kingdom ............... 8407223

[51] Int. Cl.$^4$ .................................................. H04J 3/06
[52] U.S. Cl. ......................................... 375/38; 370/108; 370/118; 371/1; 375/109
[58] Field of Search ......................... 375/38, 40, 109; 370/118, 119, 108; 455/59, 17; 340/825.03, 825.04, 825.14; 371/1

[56] References Cited

U.S. PATENT DOCUMENTS 3,304,500 2/1967 Likel .................................... 375/38

FOREIGN PATENT DOCUMENTS 0016677 of 1980 European Pat. Off. .
2074420 10/1981 United Kingdom ............... 370/118

Primary Examiner—Robert L. Griffin
Assistant Examiner—Marianne Huseman
Attorney, Agent, or Firm—Nixon & Vanderhye

[57] ABSTRACT

A broadband digital transmission system is disclosed which enables high bit rate data streams to be transmitted over low bit rate telephone networks. A high bit rate stream of data from a source is distributed by a distributor into six separate streams to provide six low bit rate streams of data. A call unit establishes six channel communication with a receiver and the six data streams are fed in parallel along six channels. A reassembler receives the six low bit rate streams and reconstructs them to produce the original high bit rate stream of data.

25 Claims, 4 Drawing Sheets

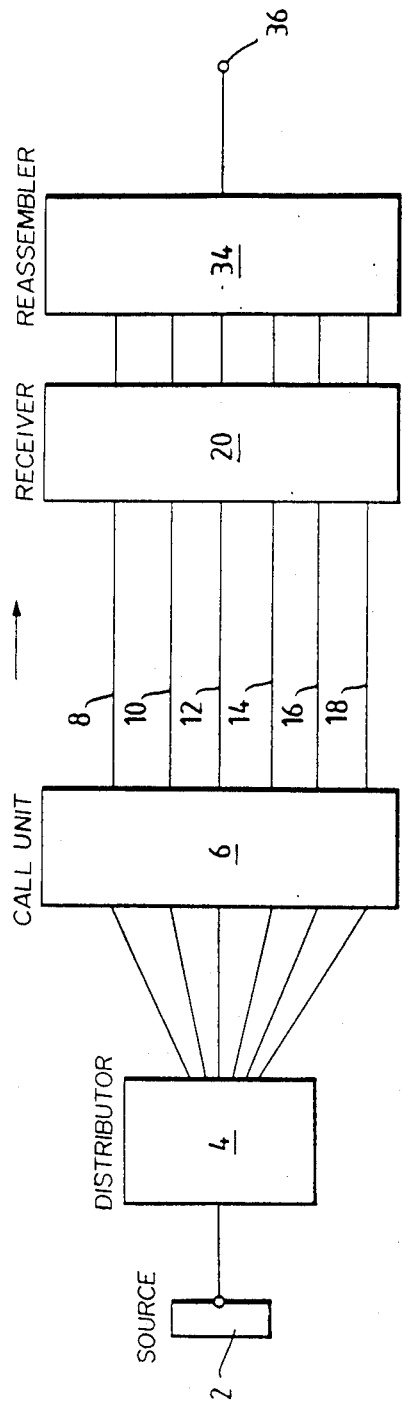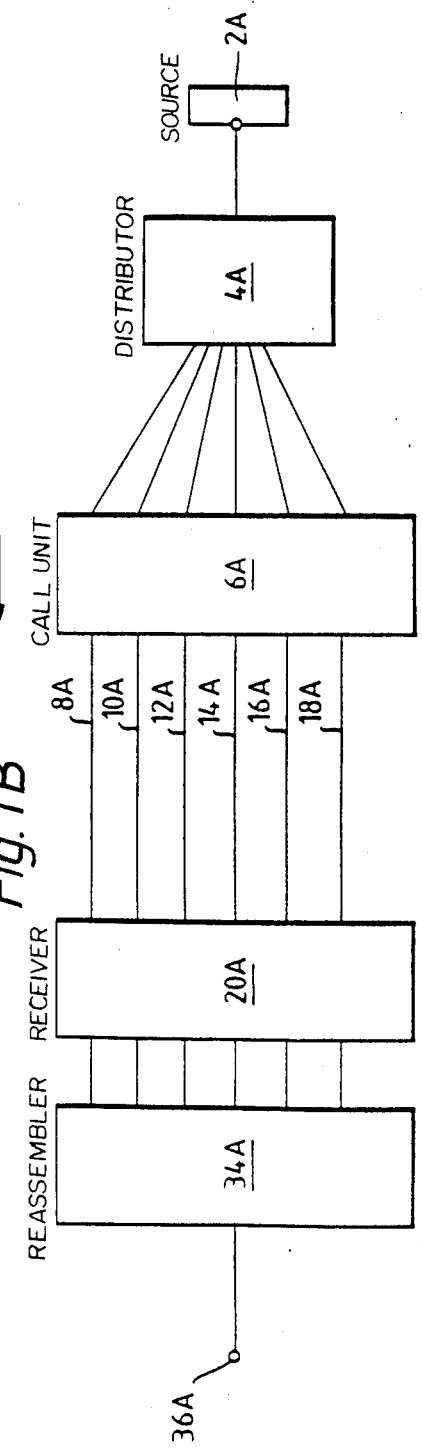

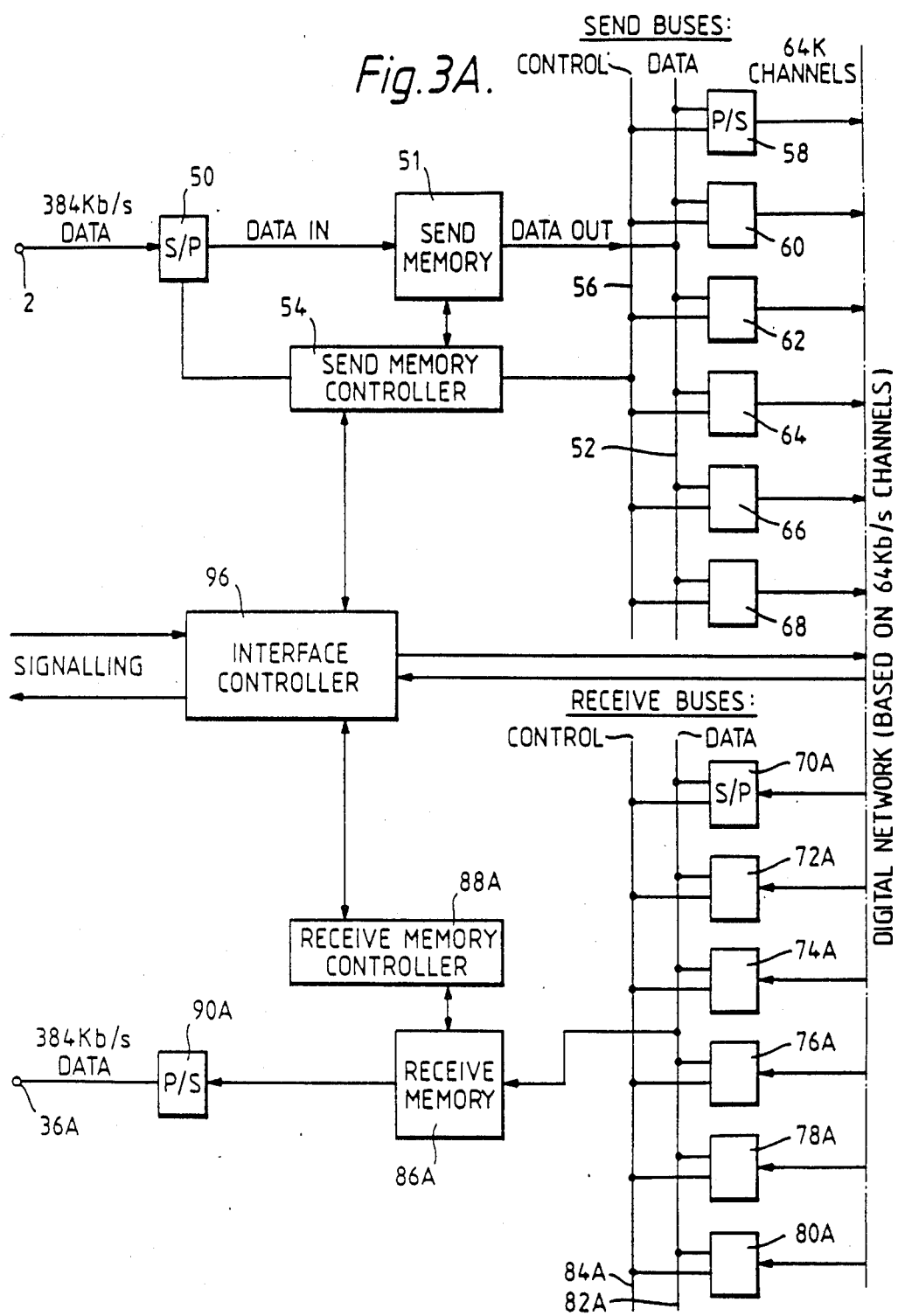

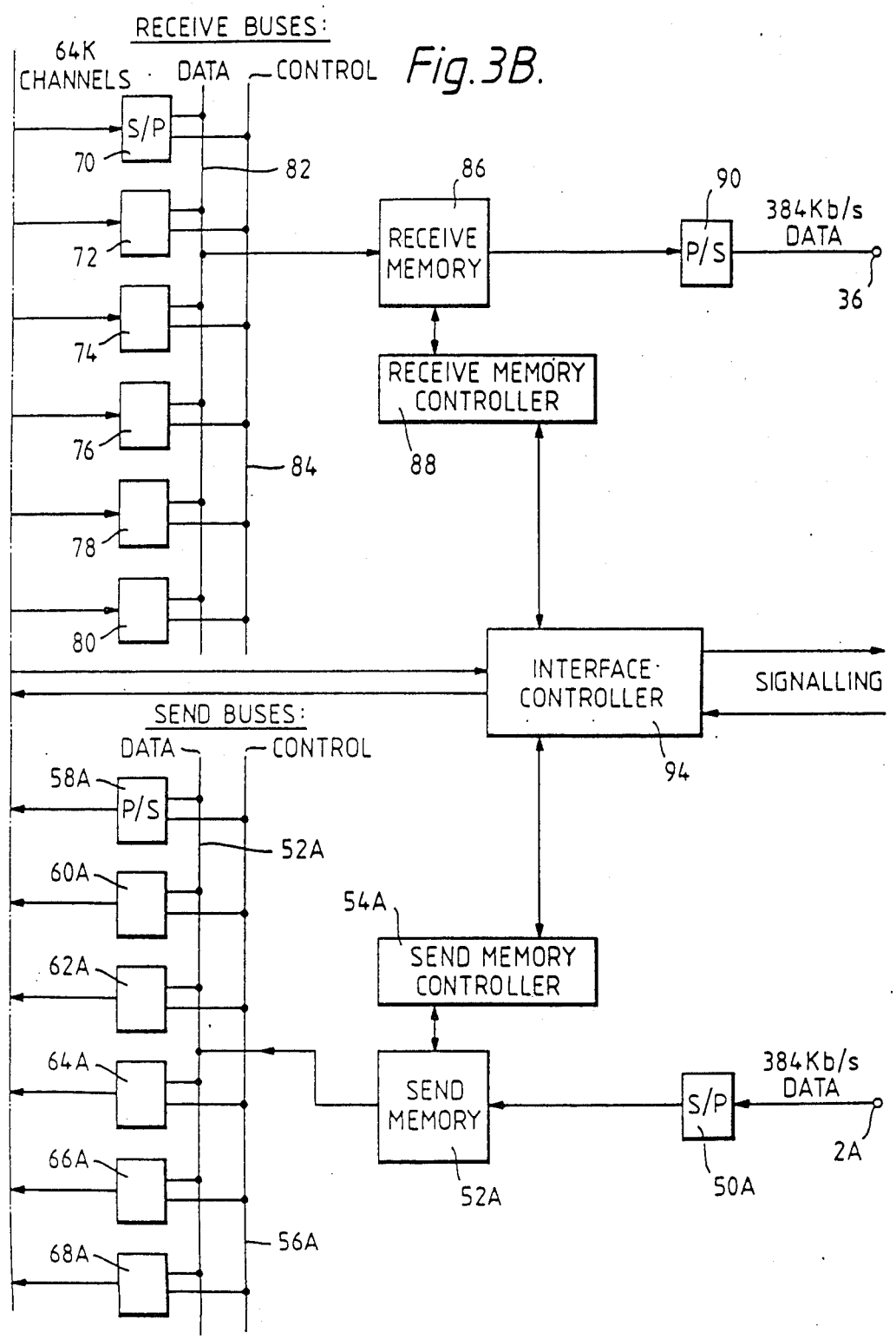

BROADBAND DIGITAL TRANSMISSION SYSTEMS

FIELD OF THE INVENTION

The present invention relates to broadband digital transmission systems.

BACKGROUND AND SUMMARY OF THE INVENTION

Telephone systems are capable of transmitting digital information in a multiplicity of time division multiplexed channels, but the characteristics of such systems are such that the maximum rate at which digital data can be transmitted along any one channel is limited for example to 64 kbits per second.

It is an object of the present invention to provide a method of increasing the rate at which data can be transmitted by combining channels.

A public switched digital network cannot guarantee to provide from a multichannel source paths of equal delay to a multichannel destination. Additionally, crossovers may occur such that all the channels at the destination will not be connected to their corresponding channels at the source.

For effective data transmission at the increased rate, these delays need equalization and crossed connections need to be rearranged.

According to the invention, there is provided a digital data transmission system comprising a distributor for distributing the data in a data stream equally to N different outputs (where N is an integer), means for establishing N channels of communication between first and second locations, each channel for carrying the data from a corresponding one of said outputs from said first to said second location, and a reassembler at said second location to reassemble the distributed data received from said N channels into said data stream in its pre-distributed form.

According to the invention, there is further provided a method of transmitting a digital data stream comprising the steps of establishing N channels (where N is an integer) of communication from a first to a second location, transmitting synchronizing signals along each channel during an initial pre-data stream transmission period, reassembling the N streams received at the second location into a data stream, determining from said synchronizing signals in the reassembled data stream any differences in the transmission times along said channels, equalizing said transmission times, cyclically distributing the data into N streams, and transmitting each said stream along a corresponding one of said channels.

BRIEF DESCRIPTION OF THE DRAWINGS

Broadband digital data transmission systems embodying the invention will now be described with reference to the accompanying diagrammatic drawings in which:

FIGS. 1A and 1B are block diagrams of a first embodiment of a system;

FIGS. 3A and 3B are more detailed block diagrams of the second embodiment.

DETAILED DESCRIPTION

Figure 2:
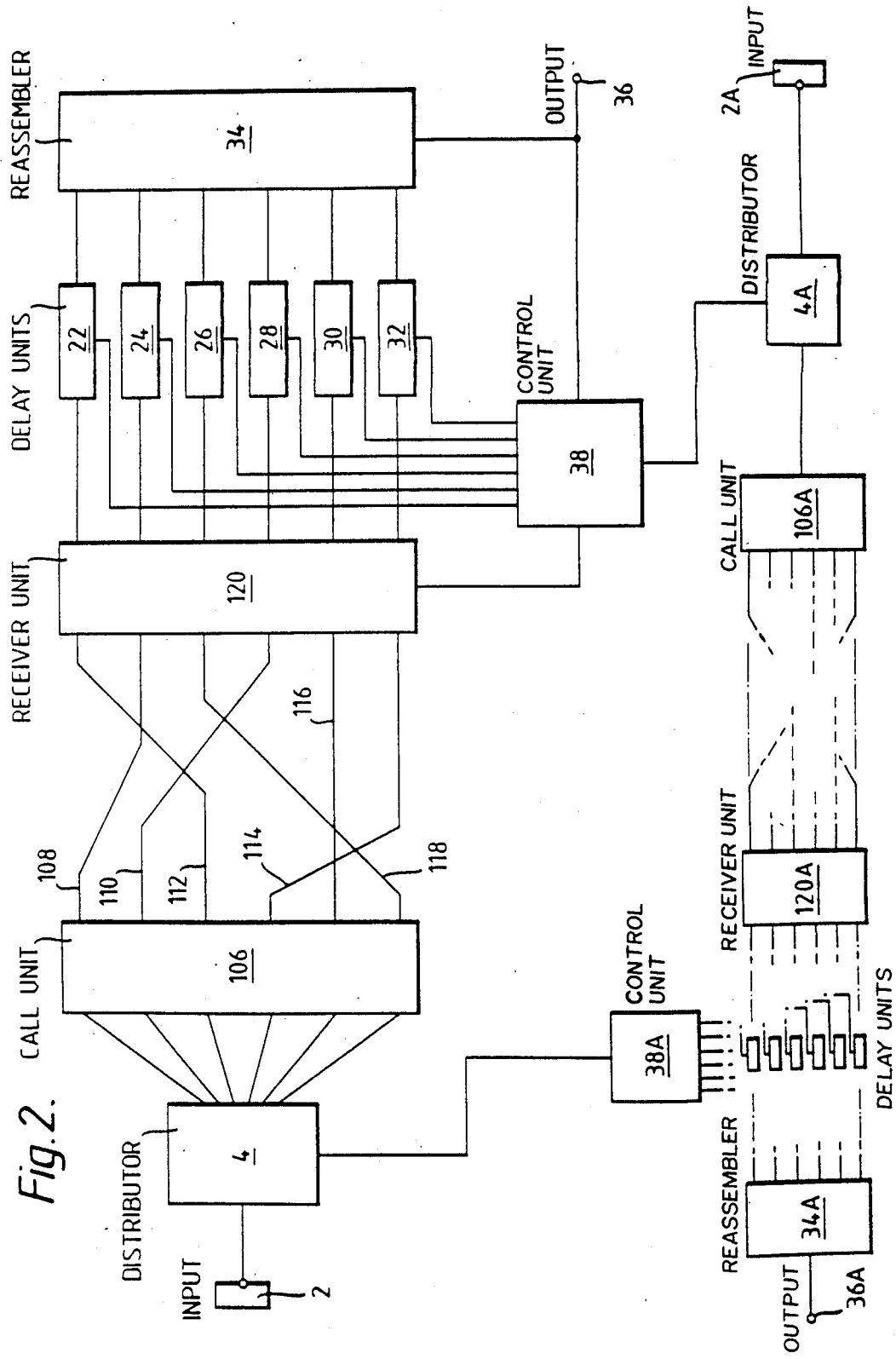
FIG. 2 is a block diagram of a second embodiment of the system.

The digital system to be described is arranged to transmit data occurring at a rate of 384 kbits/second over a conventional telephone network. In a conventional telephone network a single channel of communication is usually capable of handling data occurring at a rate of up to 64 kbits/second.

In the present system, the data occurring at a rate of 384 kbits/second is first processed by cyclically distributing successive blocks of data into six streams so that in each stream data occurs at a rate of 64 kbits/second. Six channels of communication are then established over the telephone network and each stream is fed through a respective one of the six channels.

The data received at the other end of the six channels is then reassembled into its original form, that is into a single stream having a rate of 384 kbits/second.

Where a data stream to be transmitted has a bit rate other than that which forms an integral multiple of the desired individual channel transmission bit rate, then that stream is processed before distribution (for example by inserting additional redundant bits) to have a rate equal to an integral multiple of the desired transmission rate. The redundant bits are then subsequently removed after transmission.

Also, instead of distributing the data cyclically in blocks, it can more simply be distributed in individual bits.

The system shown in FIGS. 1A and 1B are used in circumstances where the path lengths of the different channels are equal and the identity of the different channels is known. Data can be transmitted in the forward and return directions.

To transmit data in the forward direction, as shown in FIG. 1A a source 2 supplies data at a rate of 384 kbits/second. A distributor 4 in the form of an electronic commutator distributes successive blocks of bits in the output from the source 2 cyclically into six different streams. The blocks in each stream are temporarily stored in memories (not shown) and clocked out a bit rate of 64 kbits/second.

A call unit 6 when activated establishes contact with a receiver unit 20 over six different telephone channels 8 to 18. Once contact has been established, the six streams of data from the distributor 4 are fed along the six channels. A reassembler 34 receives the six streams of data and reconstitutes the data into its original form. The reassembler 34 includes a series of memories (not shown) for storing the blocks of data in each stream and an electronic commutator (not shown) for extracting the data blocks from the successive memories at a rate of 384 kbits/second.

To transmit data in the return direction, as shown in FIG. 1B components similar to those for transmission in the forward direction are used. Like components bear similar references except those for the return direction bear the additional designation A.

The system shown in FIG. 2 is used in circumstances where the identity of the different channels is known, but where the path lengths may differ, for example where the channels are routed through different exchanges.

In FIG. 2, parts similar to those in FIG. 1 are similarly referenced.

As shown, a distributor 4 distributes the output from a source 2 into six separate streams.

A call unit 106 establishes contact with a receiver unit 120 over six different channels 108 to 118. A receiver unit 120 feeds the signals from the six different channels through respective ones of six variable delay units 22 to 32 to a reassembler. The output of the reassembler is fed both to an output terminal 36 and a control unit 38 which controls the delays of the six delay units 22 to 32.

The forward and return paths of the system are interlinked for synchronization purposes. Thus the control unit 38 for the forward path communicates with its own distributor 4 via the return path. In practice, this is achieved by a link between the control unit 38 and the distributor 4A of the return path and a link between the control unit 38A of the return path and the distributor 4 of the forward path.

In operation, the call unit 106 establishes contact with the receiver unit 120 before data is transmitted. Once a connection has been established, the call unit transmits synchronizing signals in a predetermined pattern, for example in the form of a sequence of numbers 0 to 127 over each channel 108 to 118. These synchronizing signals are fed through delay units 22 to 32 and the reassembler 34, where they are combined into a single output. This output is monitored by the control unit 38, which then varies the delay units 22 to 32 in such a manner as to equalize the effective path lengths between the distributor 4 and the reassembler 34. The control unit 38 recognizes that this condition is achieved when the output from the reassembler 34 is in the form:

0,0,0,0,0,0  1,1,1,1,1,1  2,2,2,2,2,2 . . .
127,127,127,127,127,127

As soon as this condition is achieved, the control unit 38 sends a signal back to the distributor 4 via the return path to indicate that synchronization of the forward path has been achieved.

To effect synchronization in the return path, further synchronizing signals in the form of a sequence of numbers 128 to 255 are transmitted through the forward path to the distributor 4A of the return path. This can readily be achieved by adding the value 128 to the previous sequence of from 0,1,2 . . . 127. Equalization of delays along the return path is achieved in the same manner as that for the forward path and the control unit 38A recognises that this is achieved when the output from the reassembler 34A is in the form:

128,128,128,128,128,128  129,129,129,129,129,129 . . .
255,255,255,255,255,255

As soon as this condition is achieved, the control unit 38A sends a signal to the distributor 4 to commence the tranmission of user data.

The data is then transmitted in six separate streams until it reaches the reassembler 34, where it is reassembled into its original form and fed to output terminal 36.

Instead of the synchronizing signals being in groups of consecutive time slots, they can be arranged in an interspersed manner. Thus, the forward path synchronization is achieved with numbers 0,2,4,6,8 . . . 254, while the return path is achieved with numbers 1,3,5,7 . . . 255. In this way, synchronization is achieved in the forward and return paths simultaneously, instead of consecutively as previously described. In such a system the signal sent back to the distributor 4,4A is the eighth bit of the synchronization byte (value 128). In this case a control unit which recognizes, i.e. detects, correct reassembly without the presence of the eighth bit can command its associated (co-located) call unit to generate the eighth bit in its synchronization bytes, because the absence of the eighth bit in the synchronization byte received at a location indicates that correct reassembly has not yet occurred in the forward path from that location. Also, a control unit which recognizes correct reassembly with the presence of the eighth bit in the synchronization bytes can know that correct reassembly of both paths has now occurred and will command its associated call unit to commence the transmission of user data, as is mentioned above.

The first-mentioned control unit which recognized correct reassembly without the presence of the eighth bit can command its associated call unit to commence the transmission of user data when it recognizes the loss of received synchronization bytes. Alternatively, in the case where both locations are using the same synchronization bytes simultaneously, the second-mentioned control unit which recognized correct reassembly with the presence of the eighth bit can command its associated call unit to transmit the eighth bit of its synchronization bytes, whereupon the other control unit can now detect that the received synchronization bytes are the same as those transmitted from the call unit associated with that other control unit and initiate data transmission. The second-mentioned control unit can set its call unit to commence data transmission upon loss of received synchronization bytes (as mentioned above), or since both paths are now correctly reassembled it can send a predetermined number of eighth bits and then commence data transmission.

In the circumstances where the identity of the different channels are not known and the path lengths of the different channels differ, the call unit 106, the receiver 120 and the control unit 38 of FIG. 2 are modified.

The call unit 106 is so modified that during the initial calling period the code signals generated by the call unit include line identity information as well as synchronisation information.

Each channel 108 to 118 receives repetitive blocks of data. In each block of data, each alternative item of data identifies the particular channel while each intervening item of data is constituted by a corresponding one of 128 timing signals from 0 to 127.

A block of data thus appears as:

N,0N,1,N,2,N,3,N,4,N,5,N6,N,7 . . . N,126,N,127 where N has a value of from 0 to 5 depending upon which particular channel is used and 0 to 127 are the timing signals.

The receiver unit 120 is so modified that it monitors the code signals along each line, identifies the different channels and connects the different channels in the correct cyclical order through the delay units 22 to 32 to the reassembler 34. The reassembler 34 combines the code signals from the different channels and the re-combined signal is monitored by the control unit 38. The control unit 38 is so modified that in response to the data order in the re-combined signals, the control unit 38 varies the delay effected by each delay unit 33 until the data in the re-combined signal is in a pre-determined order.

The data is in the pre-determined order when each alternative group of six data items indicates that the channels are in the correct cyclical order, i.e. in the form 0,1,2,3,4,5, and each intervening group of six data items indicates that correct signal synchronization has been achieved, i.e. in the form 0,0,0,0,0,0, 1,1,1,1,1,1, . . . . 127,127,127,127,127,127. Thus, the re-combined signal should appear as 0,0,0,0,0,0, 0,1,2,3,4,5 1,1,1,1,1,1 0,1,2,3,4,5  2,2,2,2,2,2,  .  .  .  0,1,2,3,4,5 127,127,127,127,127,127 0,1,2,3,4,5.

As soon as the data has been reassembled into the correct pre-determined order, the modified control unit 38 dispatches a signal via the return path to the distributor 4 to start the synchronisation and ordering of the return path. When this has also been achieved, the distributor 4 is notified that transmission proper may now begin and data is accordingly transmitted from the source 2, distributed along six channels, reassembled, and fed to the output terminal 36.

It will be appreciated that once the six channels of communication have been established in both forward and return paths, ordered and synchronized data can be transmitted along the channels in both directions.

It will also be appreciated that the use of only six channels to carry the data is by way of example only and more channels or less channels than six can be used as required. For example, in an entire 2 Megabit/s group 30 channels are used. These would be numbered 0 to 29. The delay units are preferably in the form of shift registers capable of inserting or removing 8 bit delays.

In another modification, the call unit may also incorporate in the coded transmission a signal indicating the number of channels that are being used to enable the receiver unit to check that all channels of communication have been established. This is advantageously used when the input data rate is not an integral multiple of 64 kbit/s and the check signal is transmitted in the spare capacity. Alternatively, the check signal (also called a pilot signal) can vary with time in predetermined manner, and the distributor 4 arranged to insert the bits of the check signal into the data stream in accordance with a predetermined sequence. In this case the control unit 38 will be arranged to identify the check signal in the reassembled data stream and to prevent the bits of the check signal appearing in the output signal. This can be achieved by simple gating of the output signal or by control of reassembler 34.

If the control unit 38 detects an error in the received check signal it will command its distributor 4A to start synchronization and ordering of the return path. The check signal is selected to be different from the synchronisation and ordering signal, and hence the control unit 38A will now detect that its received check signal is incorrect and start synchronization and ordering of the forward path. It will be appreciated that where there is no spare capacity then the link quality is not monitored and the users must rely on error detecting equipment in their terminals in the usual manner.

FIGS. 3A and 3B show a more detailed block diagram of the broadband digital data transmission system of FIG. 2.

The system uses six channels of the digital network in each direction. Since each channel is capable of transmitting data at a rate of 64 kbits/second, the system as a whole is capable of handling data at a rate of 384 kb/s. That is, it provides a virtual channel of 384 kb/s in each direction.

In FIGS. 3A and 3B the components used for the return path which are similar to those used for the forward path are similarly referenced, but bear the additional designation A.

As shown, input data is supplied from a terminal 2 to a serial to parallel converter 50. The converter 50 acts to latch the parallel data. A send memory 51 acts to store data from the converter 50 and to retransmit it to a data bus bar 52. A send memory controller 54 is connected to the converter 50 and sends control signals to the send memory 51 and a control bus bar 56. Six parallel to serial converters 58 to 68 each capable of latching parallel data are each coupled to both bus bars 52 and 56 and feed six different channels of a digital network. Each of these channels terminates in a respective one of six serial to parallel converters 70 to 80. Each converter is arranged to latch parallel data and has two outputs; one output being connected to a common data bus bar 82 and the other output being connected to a common control bus bar 84. Data is fed from the common data bus bar through a receive memory 86 and a parallel to serial converter 90 (with latching of parallel data) to an output terminal 36. A receive memory controller 88 controls the receive memory 86.

An interface controller 96 is coupled to the send memory controller 54 of the forward path and the receive memory controller 88A of the return path. A second interface controller 94 is coupled to the receive memory controller 88 of the forward path and the send memory controller 54A of the return path.

The two interface controllers 96 and 94 are interlinked by paths of the digital network.

In operation, 384 kb/s data stream is fed from the terminal 2 to the serial to parallel converter 50 to be converted into parallel form from where it is stored in the send memory 51. The send memory controller 54 stores sequential bytes of data in sequential locations in the memory 51 and also controls the sequential transfer of data from the memory to the parallel to serial converters 58 to 68 via the data and control bus bars 52 and 56.

The six serial to parallel converters 70 to 80 receive the transmitted data and feed the received data via the data bus bar 82 to the receive memory 86. The receive memory controller 88 controls the transfer of data from the receive memory 86 through the parallel to serial converter 90 to the output terminal 36.

The interface controller 94 is arranged to program the receive memory controller 88 to transfer the received data to the parallel to serial converter 90 in a now-sequential manner. The receive memory 86 thus allows temporary storage of the received data so that the order of transfer to the converter is different to the order of data reception by the memory 86.

When a call is to be initiated, the interface controller 96 at the originating interface of the digital network first initiates six calls over the network to obtain six 64 kb/s channels. When the connections are established, the alignment sequence of the form N,1,N,2,N,3, is written into the sending memory 51 by the sending controller 54. The sequence is repeatedly transmitted over the six channels during initialization. The memory 51 is not connected to the 384 kb/s data channel at this stage.

At the answering interface, the interface controller 94 programs the memory controller 88 so that the output from memory 86 is in the correct order. When this has been achieved, the interface controller 94 sets up the alignment sequence for the return direction.

The calling interface controller 96 detects the returned pattern and adjusts its receive sequence of writing to the memory 86A until the correct order is obtained.

If the interface controller 94 sets up the alignment sequence for the return direction only when the output from the memory 86 is in the correct order, then interface controller 96 will know that both directions are synchronised once the output from memory 86A is in the correct order and it then signals to interface controller 94 by setting a bit (for instance the eighth bit) in the "channel" bytes in the forward direction as already described. Interface controller 94 now responds by setting the corresponding bit in the return direction, and interface controller 96 responds in turn by replacing the fixed patterns in the send memories 51 by the data from the 384 kb/s channel. Interface controller 94 does likewise when it detects the cessation of the alignment signals. It will be understood that interface controllers 94 and 96 are identical and their operation will depend on which end initiates the data call.

It will be appreciated that the alignment procedures in the return direction may be arranged to proceed independently of that in the forward direction, and each interface controller will set the eighth bit as soon as it has achieved the correct order. In this case the return direction may achieve correct order before the forward direction, and the interface controllers will operate in the inverse mode, i.e. controller 94 will commence data transmission and controller 96 will detect cessation of alignment signals.

Each interface controller supplies separate signalling to individual lines to the digital network. Thus each circuit to the digital network comprises a 64 kbit/s serial stream plus its own signalling. All six ports have signalling multiplexed in a common-channel so that only a single set of leads go into the network. This, however, is not essential.

It will also be appreciated that the interface controllers 96 and 94 do not need a means of exchanging signals with each other.

(a) raise a calling signal on outgoing ports (b) supply destination address signalling to the network (c) respond to call progress (supervisory) signals from the network (d) control call release (e) respond to calling conditions on incoming ports (from network) and (f) automatically answer those calls.

If the digital network should ever permit out-of-band end-to-end signalling between interface controllers, then of course this could be used in place of the synchronization and ordering procedures described in connection with FIG. 2.

Each interface controller can include a memory containing the number of the line at the other end to which each parallel to serial converter must be connected. The controller would then use this to auto-call the far end when a demand for service is raised on the "384k" input terminal 2.

I claim:

1. A digital data transmission system comprising a distributor for distributing the data in a data stream equally to N different outputs (where N is an integer); means including a call unit at a first location and a receiver unit at a second location for establishing N channels of communication between said first location and said second location, each channel for carrying the data from a corresponding one of said outputs from said first location to second location; a reassembler at said second location to reassemble the distributed data received from said N channels into said data stream in its pre-distributed form; variable delay means at said second location, coupling each of said channels from said receiver unit to said reassembler; and a control unit coupled to the output of the reassembler for varying the delays of said variable delay means, the call unit being operable during an initial pre-data transmission period to transmit synchronization signals along each of said channels and the control unit being operable during said pre-data transmission period to vary the said delays in response to the output from said reassembler in order to equalize the transmission time along the different channels between the call unit and the reassembler.

2. A system according to claim 1, for use when the identity of the channels is not shown, wherein the call unit is operable during said initial pre-data transmission period to transmit unique channel identifying signals along each channel and wherein the receiver unit is operable to identify said channels from said channel identifying signals and to couple said channels in the correct cyclical order to said reassembler.

3. A system according to claim 2, wherein the call unit is arranged to transmit said synchronization signals and said channel identifying signals in the form of successive blocks of code data, alternate items of data in the block constituting said channel identifying signals, and intervening items of data comprising successive counts of a counting period and constituting said synchronization signals.

4. A system according to claim 2 or claim 3, wherein the control unit transmits a signal to the distributor to start the transmission of data when the correct channel sequence and synchronization of the channels have been established.

5. A system according to claim 4, wherein the distributor acts to distribute successive blocks of data to said outputs.

6. A system according to claim 4, wherein the distributor acts to distribute successive bits of said data to said outputs.

7. A digital data transmission system for transmitting digital data streams between two locations comprising a system as claimed in claim 1 disposed at each of said two locations, each control unit being coupled to its associated co-located call unit and being arranged upon detection of correctly reassembled synchronization signals, to command its associated call unit to transmit a control signal.

8. A system as claimed in claim 7 wherein said control signal is a predetermined bit of each of a series of bytes constituting said synchronization signals.

9. A system as claimed in claim 8 wherein said series of bytes comprise successive timing signals of a counting period.

10. A system as claimed in any one of claims 7 to 9 wherein each control unit is arranged to command its associated call unit to start the transmission of data upon receipt of a said control signal if its associated call unit is already transmitting a said signal.

11. A system as claimed in claim 10 wherein each control unit is arranged to command its associated call unit to start the transmission of data upon loss of reception of correctly reassembled synchronization signals together with a said control signal.

12. A method of transmitting a digital data stream comprising the steps of establishing N channels (where N is an integer) of communication from a first to a second location, transmitting a stream of synchronizing signals along each channel thus transmitting N streams during an initial pre-data stream transmission period, reassembling the N streams received at the second location into a reassembled stream of synchronizing signals, determining from said synchronizing signals in the reassembled stream of sychronizing signals any differences in the transmission times along said channels, equalizing said transmission times, cyclically distributing the data into N streams, and transmitting each said data stream along a corresponding one of said channels.

13. A method according to claim 12, including the steps of transmitting unique channel identifying signals along each channel during an initial pre-data stream transmission period and rearranging the channels in the correct cyclical order at the second location prior to the reassembly step.

14. A method according to claim 13, wherein said synchronizing signals and said channel identifying signals are transmitted in the form of successive blocks of code data, wherein alternate items of data in the block constitute said channel identifying signals and intervening items of data comprise successive counts of a counting period and constitute said synchronizing signals.

15. A method according to any one of claims 12 to 14 including the step of transmitting a signal from the second location to the first location to indicate that the N streams are correctly reassembled and that said cyclical distribution and transmission can begin.

16. A method according to claim 15 comprising the steps of incorporating a check signal into the data stream at the first location prior to the cyclical distribution into N streams, the check signal being such that upon reassembly at the second location a determination can be made of the correct establishment of the N channels; monitoring the reassembled check signal; and determining whether the N channels are correctly established.

17. A method as claimed in claim 16 including the steps detecting of incorrect reassembly of the check signal, and signalling to the first location to cease transmission of data and start transmission of the synchronizing signals.

18. A method according claim 13 comprising the steps of incorporating a check signal into the data stream at the first location prior to the cyclical distribution into N streams, the check signal being such that upon reassembly at the second location a determination can be made of the correct establishment of the N channels; monitoring the reassembled check signal; and determining whether the N channels are correctly established.

19. A method according to claim 14 comprising the steps of incorporating a check signal into the data stream at the first location prior to the cyclical distribution into N streams, the check signal being such that upon reassembly at the second location a determination can be made of the correct establishment of the N channels; monitoring the reassembled check signal; and determining whether the N channels are correctly established.

20. A method according to claim 12 comprising the steps of incorporating a check signal into the data stream at the first location prior to the cyclical distribution into N streams, the check signal being such that upon reassembly at the second location a determination can be made of the correct establishment of the N channels; monitoring the reassembled check signal; and determining whether the N channels are correctly established.

21. A method according to any one of claims 20, 18, or 19, including the steps of detecting of incorrect reassembly of the check signal, and signalling to the first location to cease transmission of data and start transmission of the synchronizing signals.

22. A method of transmitting digital data streams between a first and second location, comprising the steps of establishing N channels (where N is an integer) of communication from the first to the second location, transmitting a stream of synchronization signals along each channel thus transmitting N streams during an initial pre-data stream transmission period, reassembling the N streams received at the second location into a single stream to form a reassembled stream, determining from said synchronization signals in the reassembled stream any differences in the transmission time along said channels, equalizing said transmission times, establishing N corresponding channels of communication from the second location to the first location, transmitting a control signal from the second location to the first location to indicate that the N streams received at the second location are correctly reassembled, transmitting synchronization signals along each of said corresponding channels during a corresponding pre-data stream transmission period, reassembling the N streams received at the first location into a single stream, determining from said synchronization signals in the reassembled stream any differences in the transmission times along said corresponding channels, equalizing said transmission times, transmitting a control signal from the first location to the second location to indicate that N streams received at the first location are correctly reassembled, determining at whichever one of the locations is the first to detect that the stream is correctly reassembled that a said control signal has been received from the other location and thereupon cyclically distributing the data at said one location into N streams and transmitting each said stream along a corresponding one of said channels, and determining at said other location that reception of synchronization signals has ceased and thereupon effecting corresponding steps of distributing and transmitting data.

23. A method as claimed in claim 22 wherein each said control signal is a predetermined bit of each of a series of bytes constituting said synchronization signals.

24. A method as claimed in claim 23 wherein said series of bytes comprise successive timing signals of a counting period.

25. A method according to any one of claims 22 to 24 comprising the steps of incorporating respective check signals into the data streams at the first and second locations prior to the cyclical distribution into N streams, the check signals being such that upon reassembly at the receiving location a determination can be made of the correct establishment of the N channels; monitoring the respective reassembled check signals to determining whether the N channels remain correctly established; and if incorrect establishment occurs, ceasing transmission of the data and starting the transmission of the synchronizing signals.

* * * * *